(12) United States Patent
Shirai

(10) Patent No.: US 10,846,033 B2
(45) Date of Patent: Nov. 24, 2020

(54) PRINT SERVER, CONTROL METHOD, AND STORAGE MEDIUM

(71) Applicant: CANON KABUSHIKI KAISHA, Tokyo (JP)

(72) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/445,074

(22) Filed: Jun. 18, 2019

(65) Prior Publication Data

US 2020/0019359 A1 Jan. 16, 2020

(30) Foreign Application Priority Data

Jul. 13, 2018 (JP) ................................. 2018-133162

(51) Int. Cl.
*G06F 3/12* (2006.01)
(52) U.S. Cl.
CPC .......... *G06F 3/1254* (2013.01); *G06F 3/1204* (2013.01); *G06F 3/1205* (2013.01); *G06F 3/1267* (2013.01); *G06F 3/1288* (2013.01)
(58) Field of Classification Search
None
See application file for complete search history.

(56) References Cited

U.S. PATENT DOCUMENTS

| 2011/0205588 | A1* | 8/2011 | Yabe | G06F 3/1222 |
| | | | | 358/1.15 |
| 2011/0242594 | A1* | 10/2011 | Yabe | G06F 3/1287 |
| | | | | 358/1.15 |
| 2012/0307293 | A1* | 12/2012 | Natori | G06F 3/124 |
| | | | | 358/1.15 |
| 2015/0293734 | A1* | 10/2015 | Shirai | G06F 3/1234 |
| | | | | 358/1.15 |
| 2017/0031638 | A1* | 2/2017 | Kitagata | H04N 1/32523 |
| 2018/0067701 | A1* | 3/2018 | Shirai | G06F 9/5083 |
| 2018/0121146 | A1* | 5/2018 | Takaoka | G06F 3/1285 |

FOREIGN PATENT DOCUMENTS

| JP | 2008-027344 A | | 2/2008 |
| JP | 2008027344 A | * | 2/2008 |

* cited by examiner

*Primary Examiner* — Ted W Barnes
(74) *Attorney, Agent, or Firm* — Canon U.S.A., Inc. IP Division

(57) ABSTRACT

A print server includes a determination unit configured to receive a print request from a client, identify a document identification from the print request, and determine whether document information including the document identification is acquired, and an acquisition unit configured to acquire the document information by sending an inquiry to a document server in response to a determination by the determination unit that the document information is not acquired.

10 Claims, 9 Drawing Sheets

FIG.2
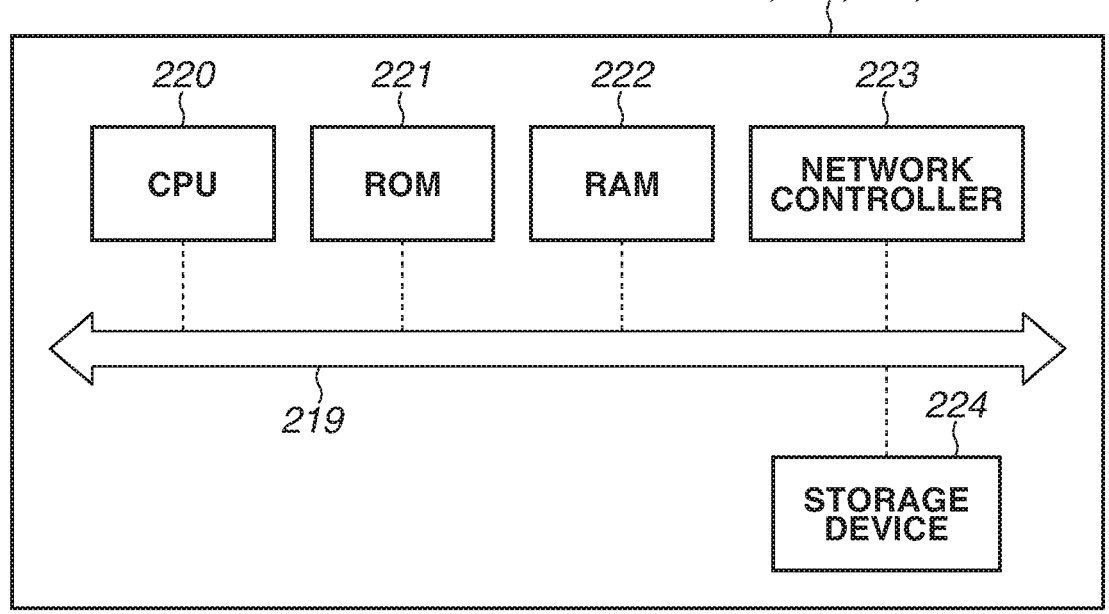
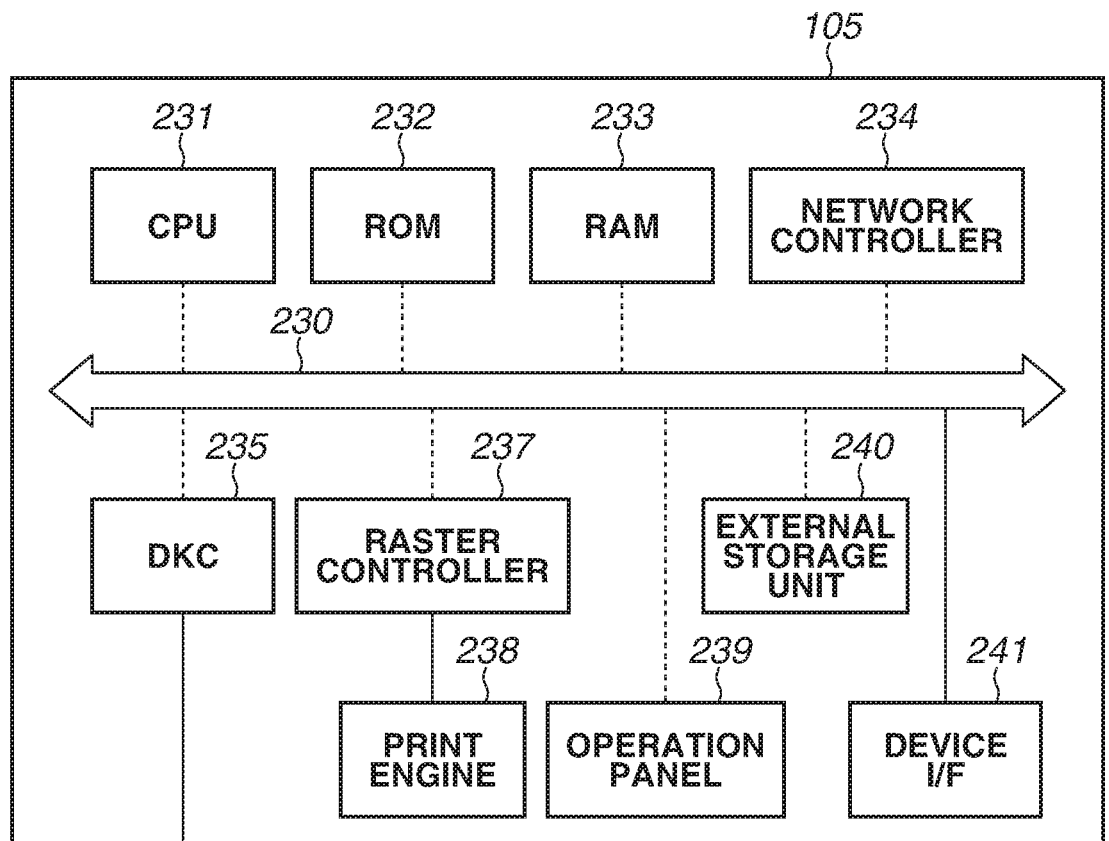
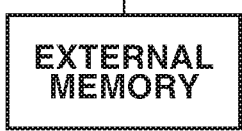

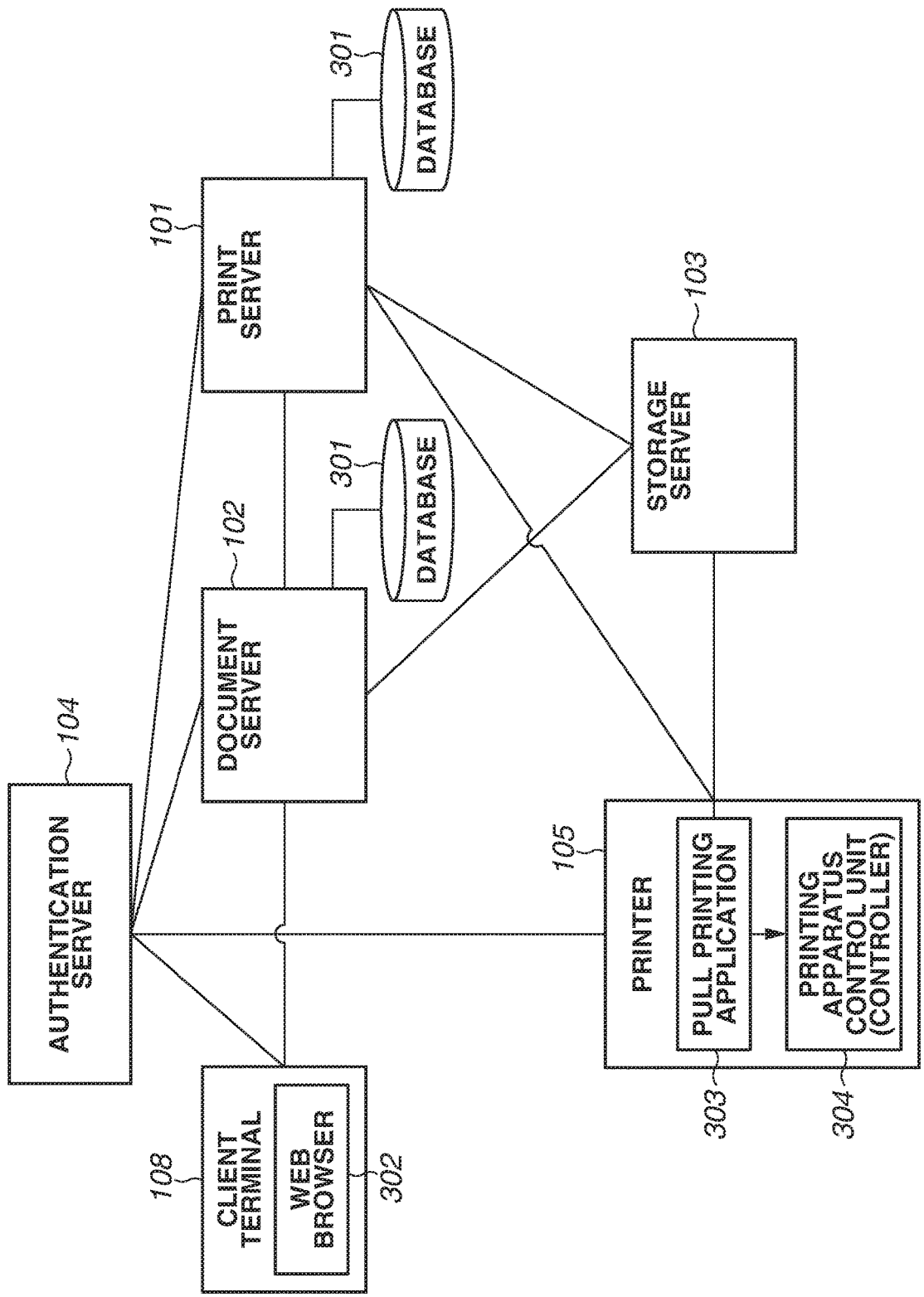

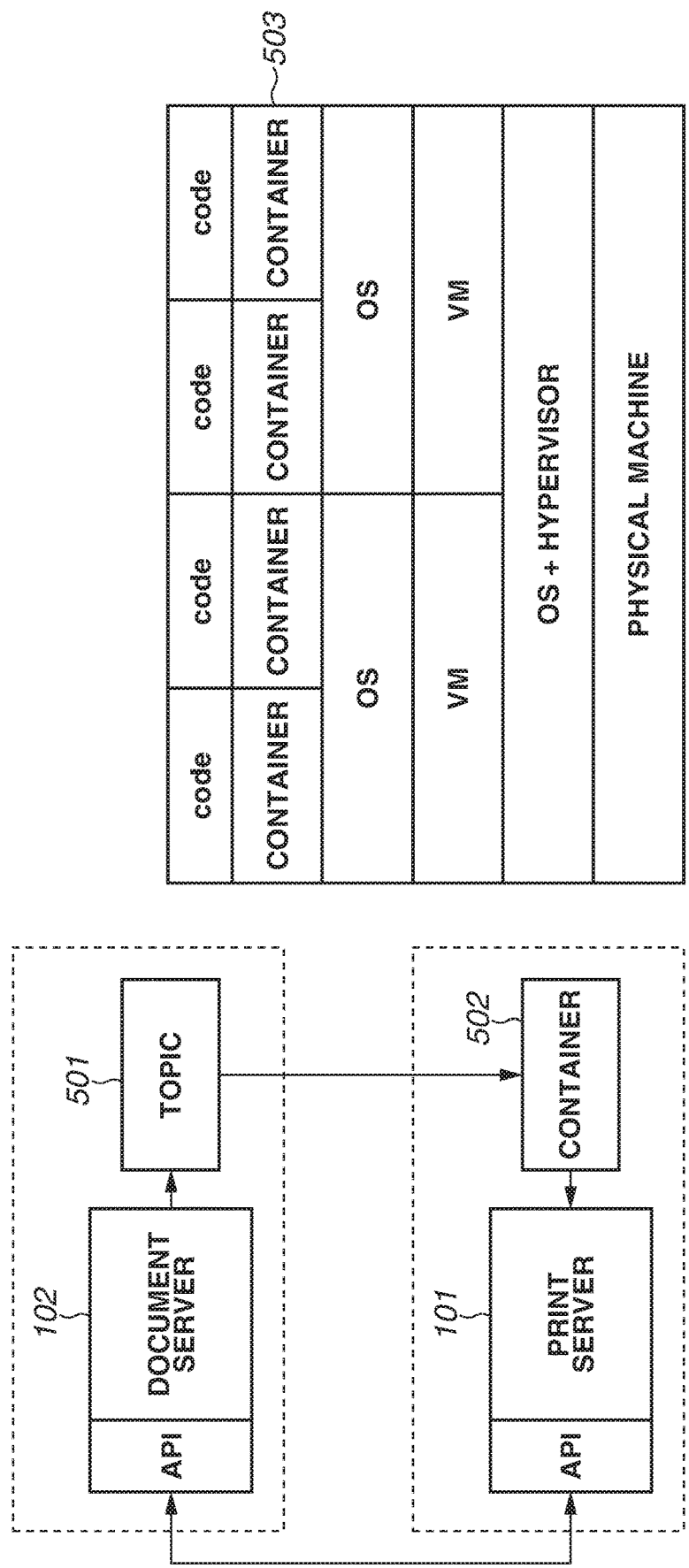

FIG.6

| | |
|---|---|
| 600 | DOCUMENT INFORMATION |
| 601 | DOCUMENT ID |
| 602 | DOCUMENT NAME |
| 603 | USER NAME |
| 604 | DOCUMENT URL |
| 605 | STATUS |
| | . . . |

| | |
|---|---|
| 610 | JOB INFORMATION |
| 611 | JOB ID |
| 612 | DOCUMENT ID |
| 613 | USER NAME |
| 614 | RECEPTION DATE/TIME |
| 615 | CONVERSION STATUS |
| | . . . |

| | |
|---|---|
| 620 | PRINT DOCUMENT INFORMATION |
| 621 | DOCUMENT ID |
| 622 | DOCUMENT URL |
| 623 | RECEPTION DATE/TIME |
| | . . . |

PRINT SERVER, CONTROL METHOD, AND STORAGE MEDIUM

BACKGROUND OF THE INVENTION

Field of the Invention

The present invention relates to a print server, a control method, and a storage medium for performing communication by asynchronous communication.

Description of the Related Art

In these days, a business in which a server is used for providing a cloud service on the Internet is widely spread. Such a business includes a storage service that stores data in a file format and a database service that provides a database function. Also, in print systems, there is a demand for a print server that provides a print service on the Internet.

In order to improve reusability, maintainability, and flexibility, a micro service architecture in which small sized cloud services are combined is becoming mainstream. In the micro service architecture, a high degree of independence (i.e., loose coupling) of the small sized services is one important element, and a pub/sub messaging model is applied to achieve the high degree of independence.

In the pub/sub messaging model, a publisher that transmits a message and a subscriber that receives the message exchange information through a topic (i.e., named logical channel) which is present between the publisher and the subscriber. The publisher transmits information without any regard for the reception side, and the subscriber receives only the topic of the information necessary for the subscriber to perform processing. Thus, the publisher and the subscriber do not need to be aware of the service with each other. Accordingly, the degree of coupling between the publisher and the subscriber can be lowered and thus asynchronous communication can be achieved.

Japanese Patent Application Laid-Open No. 2008-27344 discusses a method which a plurality of services performs asynchronous communication and cooperates with each other while suppressing a deterioration in system processing efficiency.

SUMMARY OF THE INVENTION

According to an aspect of the present invention, a print server that asynchronously acquires document information transmitted from a document server via a mediation service, acquires document data based on the document information, creates print data based on the document data, and transmits the print data to a printer, the print server including a determination unit configured to receive a print request from a client, identify a document identification from the print request, and determine whether the document information including the document ID is acquired, and an acquisition unit configured to acquire the document information by sending an inquiry to the document server in response to a determination by the determination unit that the document information is not acquired.

Further features of the present invention will become apparent from the following description of exemplary embodiments with reference to the attached drawings.

BRIEF DESCRIPTION OF THE DRAWINGS

FIG. 2 is a hardware block diagram of a print server and a printer.

FIG. 3 is a module block diagram of the print system.

FIG. 5 illustrates an example of message transmission processing.

FIG. 6 illustrates data to be managed by the print server and the document server.

DESCRIPTION OF THE EMBODIMENTS

In a case of exchanging information by asynchronous communication in a cloud service, however, a trouble such as a delay in the communication environment on the Internet may occur. In particular, also in the case of transmitting or receiving a message using a service provided by a third party, the reception of the message on the reception side may be delayed due to a failure or the like in the service.

In a case of a document service for managing a document and a print service for managing printing, the print service checks, by asynchronous communication, that a document has been input. If such a delay occurs, a print request may be received in a state where the print service side has not received, information indicating that a document has been input, so that printing the document cannot be performed. Further, in a case where a configuration in which two services are synchronized is employed, if an inquiry is sent to the document service every time a print request is made, costs for invoking the service increase, which has a great influence on the performance of print processing.

The present invention is directed to providing a function that enables printing of an input document even when a delay occurs in asynchronous communication in a system in which a document service and a print service cooperate with each other asynchronously.

The system in which the document service and the print service cooperate with each other asynchronously can provide a function that enables printing of an input document even when a delay occurs in asynchronous communication.

Exemplary embodiments of the present invention will be described below with reference to the accompanying drawings.

<Network Configuration>

Figure 1:
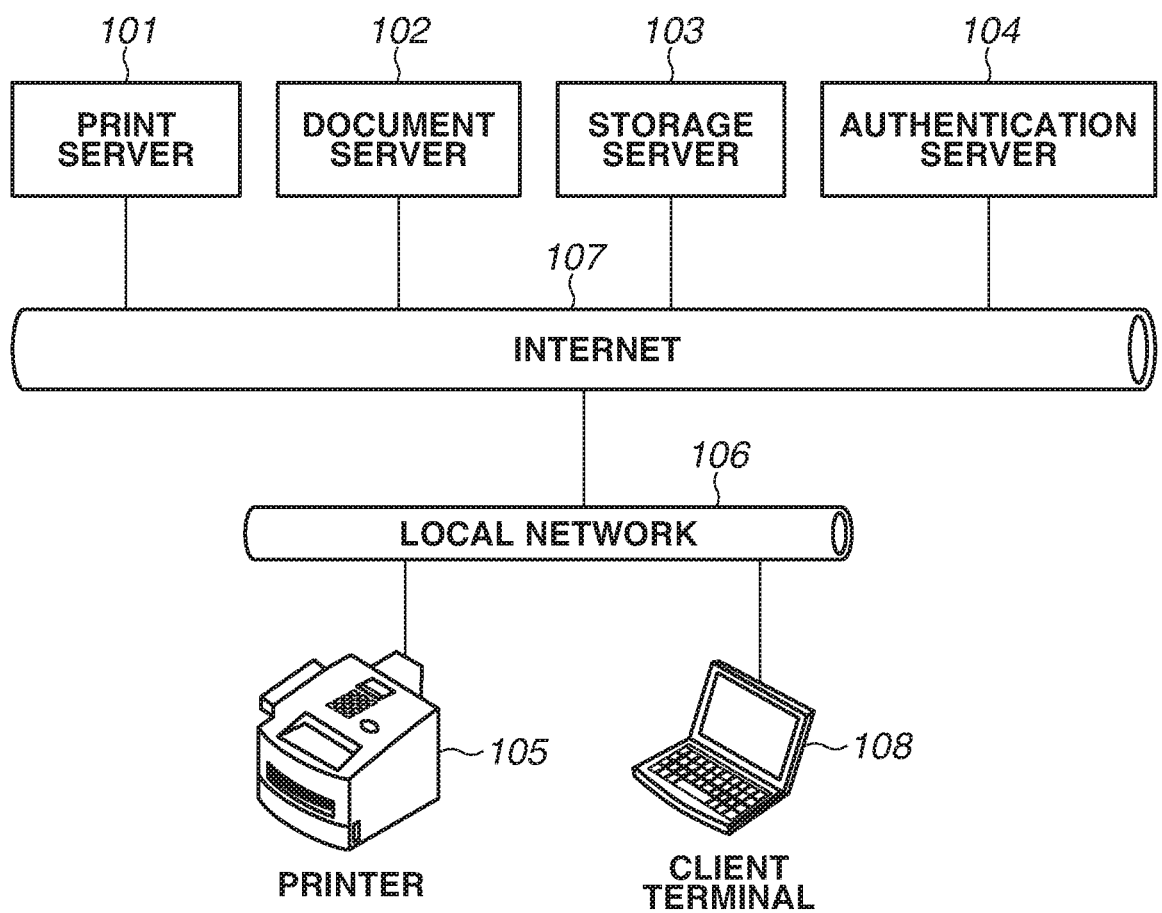
FIG. 1 is a block diagram illustrating a network configuration of a print system.

FIG. 1 illustrates a network configuration of a print system according to an exemplary embodiment of the present invention. In FIG. 1, it is assumed that a plurality of printers 105 and a plurality of client terminals 108 are connected via a local network 106. Each printer 105 and each client terminal 108 can access the Internet 107 via the local network 106, and can also access each of a print server 101, a document server 102, a storage server 103, and an authentication server 104.

The printer 105 and the client terminal 108 are each connected to a network via a wired or wireless local area network (LAN). Examples of the networks 106 and 107 include a LAN, a wide area network (WAN), a telephone line, a dedicated digital line, an asynchronous transfer mode (ATM) line, a frame relay line, a cable television line, and a data broadcasting wireless line. The network 106 is so-called communication network and may be implemented by a combination of networks described above. Any network can be used as the networks 106 and 107, as long as the network can be used to transmit and receive data. A function for establishing communication from the client terminal 108 to each of the print server 101 and the printer 105 may be different from a function for establishing communication from the printer 105 to each of the print server 101, the document server 102, the storage server 103, and the authentication server 104.

The client terminal 108 is, for example, a desktop personal computer, a notebook personal computer, a mobile personal computer, a personal digital assistant (PDA), or a cellular phone having a built-in program executable environment. The client terminal 108 has a built-in program executable environment such as a web browser (i.e., an Internet browser, a world wide web (WWW) browser, or a browser used for WWW).

The print server 101 receives together with a print request, from a web browser of the client terminal 108, information for identifying a document input to the document server 102 in advance and information for identifying the output destination printer 105. Then, the print server 101 returns a response including a command to execute a print instruction to the web browser of the client terminal 108. The web browser of the client terminal 108 issues the received command to execute the print instruction to the designated printer 105. Upon receiving the print command from the web browser of the client terminal 108, the printer 105 acquires print data from the storage server 103, and performs printing. In a case where the printer 105 performs pull printing using an integrated circuit (IC) card, the print server 101 may receive a print request from the printer 105.

While a first exemplary embodiment illustrates a configuration including one apparatus for each of the servers, a plurality of apparatuses may be provided. Further, the print server 101, the document server 102, the storage server 103, and the authentication server 104 may be configured such that a plurality of servers is caused to function as a single server by virtualization.

<Hardware Configuration of Print Server, Document Server, and Printer>

FIG. 2 illustrates a hardware configuration of each of the print server 101, the document server 102, the storage server 103 and the authentication server 104, and a hardware configuration of the printer 105. Unless otherwise noted, the present invention is applicable to a single apparatus or a system composed of a plurality of apparatuses, as long as the functions according to aspects of the present invention can be executed. Unless otherwise noted, the present invention is applicable to a system that is connected via a network, such as a LAN and WAN, and performs processing, as long as the functions according to aspects of the present invention can be executed. The first exemplary embodiment is described assuming that the components are connected by a system bus 219.

A central processing unit (CPU) 220 is a control device for an information processing apparatus, and executes an application program, an operating system (OS), and the like for the print server 101. The application program, the OS, and the like are stored in a storage device 224. The CPU 220 performs control to temporarily store information, a file, and the like necessary for executing programs into a random access memory (RAM) 222. Further, the CPU 220 executes, for example, conversion processing for converting data into print data in the application program in the print server 101.

A read-only memory (ROM) 221 is a storage unit and stores programs, such as a basic input/output (I/O) program, font data used during conversion of data into print data, and various data necessary for print processing and data conversion processing. The RAM 222 is a temporary storage unit and functions as a main memory, a work area, or the like for the CPU 220. The storage device 224 is an example of an external storage unit. The storage device 224 functions as a large-capacity memory and stores an application program, an OS, and the like. Data is exchanged with an external apparatus via a network controller 223.

Hardware components of the printer 105 are each connected to a system bus 230. A CPU 231 controls the entire apparatus and also controls an access to various devices connected to the system bus 230 in an integrated manner. The control processing of the CPU 231 is based on a control program stored in a ROM 232, a control program and resource data (i.e., resource information) stored in an external memory 236 connected via a disk controller (DKC) 235, and the like. A RAM 233 functions as a main memory, a work area, or the like for the CPU 231, and is configured such that the memory capacity can be expanded using an optional RAM connected to an expansion port (not illustrated).

An external storage unit 240 functions as a large-capacity memory. An operation panel (i.e., operation unit) 239 displays a screen or receives an operation instruction from a user through the screen. In addition, buttons and a display unit, such as a liquid crystal panel, are arranged to perform an operation, such as setting of an operation mode of the printer 105, display of an operation status of the printer 105, and designation of content data to be printed. Data is exchanged with the external apparatus via a network controller 234. A print engine 238 illustrated in FIG. 2 uses a known printing technique. Examples of a preferable execution system include a print engine employing an electrophotographic method (i.e., laser beam method), an inkjet method, and a sublimation(i.e., thermal transfer) method. A raster controller 237 is a controller that converts print data described in page description language (PDL) into image data. A device interface (I/F) 241 is a connection I/F for connecting to the external apparatus that is connectable by a universal serial bus (USB) or the like.

<System Configuration>

FIG. 3 is a block diagram illustrating the print system according to an exemplary embodiment of the present invention. Operations of each server, each printer, and each client terminal will now be described with reference to the block diagram of the printing system. These operations are implemented in such a manner that the CPU executes programs stored in a memory of each apparatus.

The document server 102 creates a uniform resource locator (URL) indicating an input destination of document data input by another service or another program, and returns the URL to the other service or the other program. In the present exemplary embodiment, the URL is a URL indicating an upload destination of the document data in the storage server 103. The other service or the other program uploads the document data on the URL in the storage server 103. Upon receiving information indicating that the document data has been uploaded from the other service or the other program, the document server 102 stores print document information 620 about the input document data into a database 301.

Although FIG. 3 illustrates the database 301 for each of the print server 101 and the document server 102, the present exemplary embodiment assumes a case where a partitioned logically database is used as the database 301. As a matter of course, physically separate databases may also be used. At the same time, the document server 102 transmits the print document information 620 as a message. A method for transmitting the message is described below. The print server 101 receives the message through a named logical channel. Upon receiving a print request from a web browser 302, the print server 101 acquires, from the storage server 103, document data associated with a document identification (ID) 621, which is received together with the print request, and converts the acquired document data into print data. The print server 101 creates print data, creates a download URL on the storage server 103, and uploads the print data to the storage server 103.

The authentication server 104 holds authentication information that are used to access the print server 101. The information includes a user name, a password, an authentication token, and an authorization token. The print server 101 sends the authentication token included in a request from the web browser 302 in the client terminal 108 to the authentication server 104, and verifies the validity of the authentication token. In this case, if the request from the web browser 302 does not include any authentication token, the print server 101 redirects the request to the authentication server 104.

The authentication server 104 returns a login screen 500 to the web browser 302. The authentication server 104 verifies the validity by comparing a user name and a password which are included a login request from the login screen 500 displayed on the web browser 302 with the user name and the password which are held in the authentication server 104. If the verification is successful, the authentication server 104 issues the authentication token associated with the user, and sends a response, to the web browser 302, for redirecting to the print server 101 together with the authentication token.

The web browser 302 sends the request including the authentication token to the print server 101, receives a web screen in the response from the print server 101, and displays the web screen. The authentication server 104 issues an authorization token necessary for a pull printing application 303 placed in the printer 105 to access the print server 101. Further, the authentication server 104 verifies the validity of the authorization token included in the request when the pull printing application 303 accesses the print server 101.

The pull printing application 303 sends the request including the authorization token to the print server 101, and acquires a download URL. The pull printing application 303 acquires print data from the storage server 103 in accordance with the download URL, sends the print data to a printing apparatus control unit 304, and performs printing.

<Document Server Message Transmission>

Message transmission processing to be performed by the document server 102 will be described with reference to FIG. 5. In the present exemplary embodiment, the document server 102 and the print server 101 exchange information using an Application Programing Interface (API), and exchange information using an asynchronous message that uses a named logical channel.

The print server 101 and the document server 102 can use functions released by the corresponding one of the print server 101 and the document server 102 by invoking the API of the corresponding server. However, since invoking of the API puts a load on the server that has invoked the API, the first exemplary embodiment is configured so as to prevent the API from being invoked as much as possible in processing other than recovery processing described below.

The document server 102 prepares a named logical channel for services other than services included in the document server 102. The named logical channel is hereinafter referred to as a topic. The first exemplary embodiment assumes a case where a topic 501 is also created when the document server 102 is placed as a cloud service. Alternatively, the document server 102 may dynamically create the topic as needed. The first exemplary embodiment also assumes a case where the topic is created using cloud service provided by a third party. The topic has a unique name on the cloud service, and another service (i.e., print server 101 in the present exemplary embodiment) registers a subscription using the name. In other words, the topic is a mediation service and has a configuration necessary for implementing asynchronous communication between the print server 101 and the document server 102.

When the document server 102 transmits the print document information 620 as a message to the topic 501, a notification is sent to the print server 101 that has registered a subscription to the topic 501. The print server 101 holds information about the received message in the database 301. Thus, asynchronous message transmission/reception processing between the document server 102 and the print server 101 can be implemented. In other words, the print server 101 and the document server 102 indirectly communicate with each other through the function of the topic 501, instead of directly communicating with each other, and thus can exchange messages without considering the status of each apparatus.

<Topic Notification>

Topic notification processing will be described. The first exemplary embodiment assumes a case where a notification is sent using a software container. In the software container, an OS environment (only necessary OS function) is implemented as a process for each isolated space. FIG. 5 schematically illustrates software containers 503. Software containers 503 are each activated as a process from an OS of a virtual machine (VM) on a physical machine, and execute a preliminarily registered code. Unlike in the VM of the related art in which the entire OS is activated, in the present exemplary embodiment, it is only necessary to activate a process on a host OS in the processing, so that the activation at a high speed can be achieved. However, in the case of using a software container, code is loaded at the first time, which leads to an increase in cost, and the execution may be delayed if re-creation of a software container occurs due to scaling out, a failure of the software container itself, or the like.

In the first exemplary embodiment, when the print server 101 registers a subscription to the topic 501, a software container 502 of the print server 101 is registered. When the document server 102 transmits a message to the topic 501, the software container 502 is invoked from the topic 501. When the software container 502 is invoked, the software container 502 executes a predetermined code to check the received message, and sends the content of the received message to the print server 101. Assume that the topic 501 is a software function to run on the OS operating on the VM. The first exemplary embodiment is described assuming that the topic 501 and the software container 502 are implemented in apparatuses different from the document server 102 and the print server 101 respectively. However, the topic 501 and the software container 502 may be implemented in the same apparatus.

<Software Configuration of Document Server>

Figure 4A:
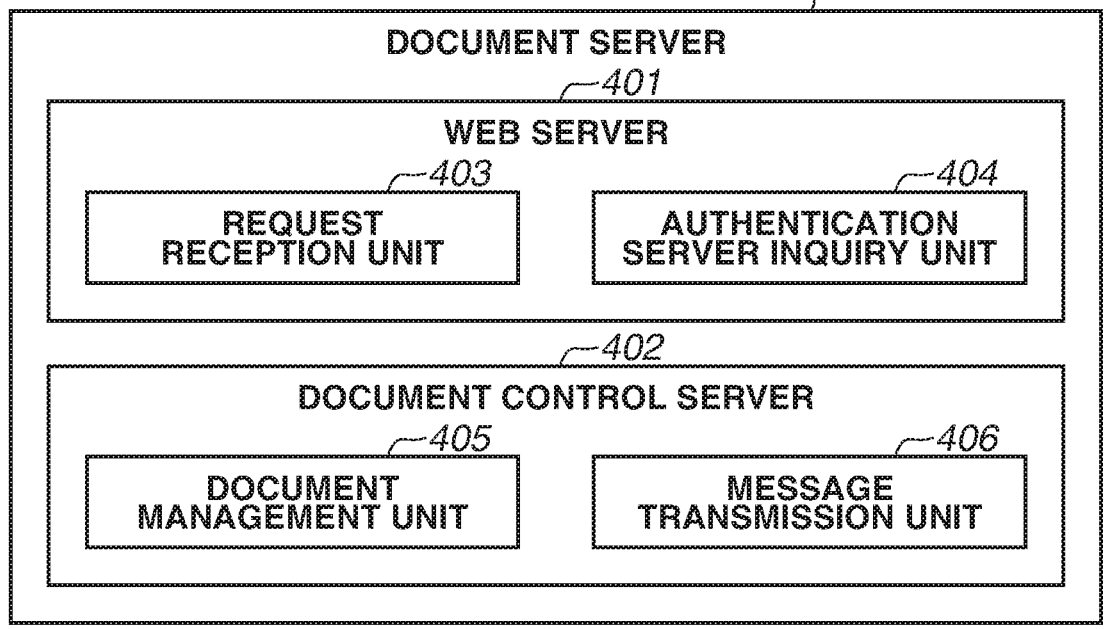
FIG. 4A is a software block diagram of a document server.

FIG. 4A is a software block diagram illustrating the document server 102 according to the exemplary embodiment of the present invention. Software modules of the document server 102 are stored in the storage device 224 illustrated in FIG. 2, and are loaded into the RAM 222 to be executed by the CPU 220 as described above. An operation of each software module stored in the document server 102, in a state where the document server 102 receives an external request, will be described.

The document server 102 includes a web server 401 that receives an external request, and a document control server 402 that manages document information. The web server 401 and the document control server 402 are separate programs, and can be arranged in separate information processing apparatuses. These programs are respectively arranged in the information processing apparatuses, which are each connected to a network, and the programs communicate with each other. Each server is placed to have a single configuration or a redundant configuration. Accordingly, each server may be configured using a plurality of information processing apparatuses. This configuration is also applied to each software configuration of the print server 101 to be described below.

The web server 401 receives a document input request from another service, another program, the printer 105, or the web browser 302. When a request reception unit 403 receives a request from a client, an authentication server inquiry unit 404 sends a token validity verification request to the authentication server 104. When the validity of the token is confirmed, the request reception unit 403 sends the request from the client to the document control server 402.

When the document control server 402 receives a document data input request, the document control server 402 causes a document management unit 405 to create document information 600, and stores the created document information 600 into the database 301. FIG. 6 illustrates each piece of information including the document information 600. The document control server 402 causes the message transmission unit 406 to transmit the document information 600 to the topic 501 described above. At this time point, the print server 101 receives a message via a message reception unit 417 and holds the message as the print document information 620 to be described below.

The document information 600 includes a document ID 601 for identifying document data, a document name 602, a user name 603 associated with an authentication token, a document URL 604 for uploading a document to the storage server 103, and a status 605. The document URL 604 includes the document ID 601. The status 605 includes statuses such as "receiving", "unprinted", "idling", "waiting for print", "printing", "normal end", "error end", and "unknown end".

The document control server 402 changes the status 605 of the document information 600 to "receiving" and returns the document URL 604 to the web server 401. Then, the web server 401 returns the document URL 604 to another service or another program that has sent a request. Upon completing uploading of document data to the storage server 103, the other service or the other program sends an upload completion notification to the document server 102. When the document server 102 receives this notification on the web server 401, the document control server 402 changes the status 605 of the document information 600 to "idling".

<Software Configuration of Print Server>

Figure 4B:
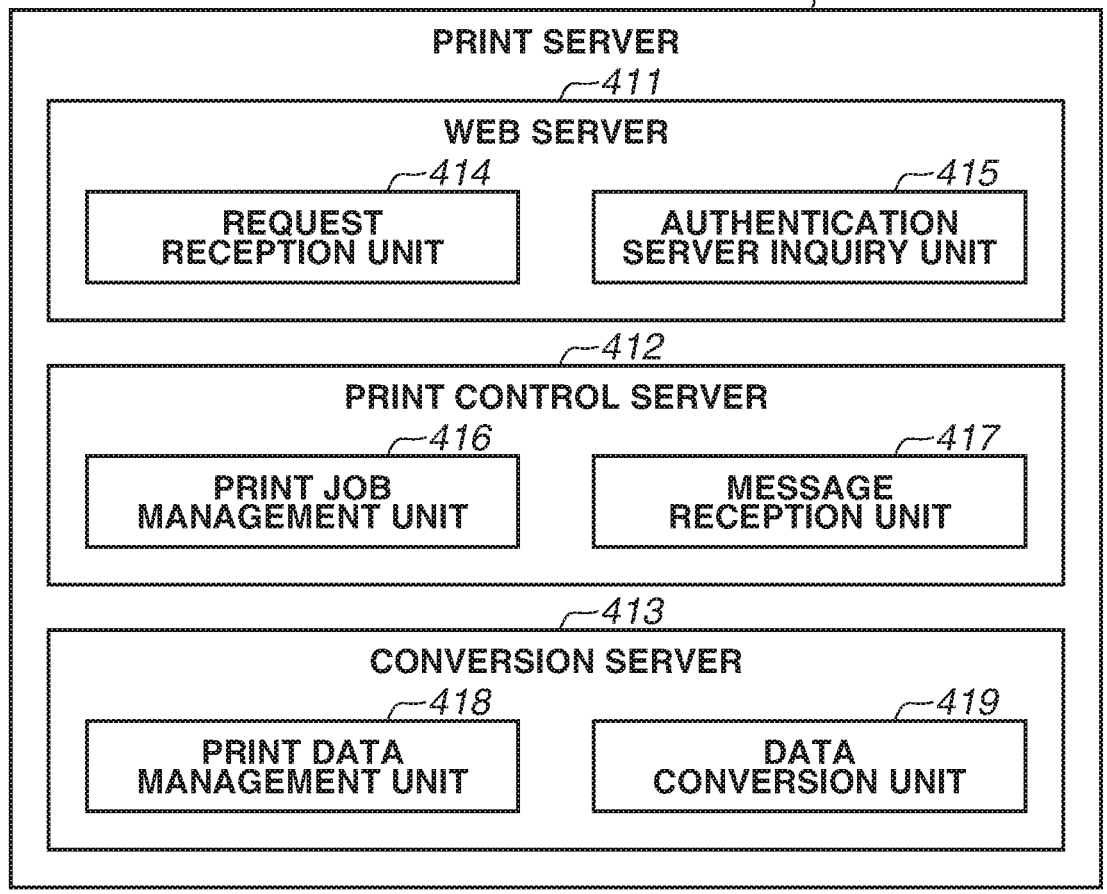
FIG. 4B is a software block diagram of the print server.

FIG. 4B is a software block diagram illustrating the print server 101 according to the exemplary embodiment of the present invention. Software modules of the print server 101 is stored in the storage device 224 illustrated in FIG. 2, and the software modules are loaded into the RAM 222 and executed by the CPU 220 as described above.

The print server 101 includes a web server 411 that receives an external request, a print control server 412 that controls a print job and print processing, and a conversion server 413 that convers document data into print data.

The web server 411 receives a print request and a print data acquisition request from another server, another program, the printer 105, or the web browser 302. When a request reception unit 414 receives each request from each apparatus as a client, an authentication server inquiry unit 415 sends a token validity verification request to the authentication server 104. When the validity of the token is confirmed, the request reception unit 414 sends the request from the client to the print control server 412.

When the print control server 412 receives a print request, a print job management unit 416 creates job information 610 in response to the print request, and stores the created job information 610 into the database 301. The print request includes a document ID 612 for printing. Like the document ID 621 included in the print document information 620, the document 612 is information that has been notified as a message from the document server 102 and preliminarily held. The print document information 620 also includes a document URL 622 and a reception date/time 623 when a document input is received.

The job information 610 created by the print job management unit 416 includes a job ID 611 for identifying a print job, a user name 613 associated with an authentication token, a print reception date/time 614, and a conversion status 615. The print job management unit 416 instructs the conversion server 413 to convert document data into print data.

Upon receiving a print data conversion instruction from the print control server 412, a print data management unit 418 of the conversion server 413 downloads document data from the storage server 103 in accordance with the document URL 622. Then, a data conversion unit 419 converts the document data into print data and uploads the print data to the storage server 103.

<Recovery Processing to Be Performed When a Message is Delayed>

In addition to the above description, a recovery method for the print server 101 when an input notification message from the document server 102 is delayed will be described with reference to a flowchart illustrated in FIG. 7. A part of the processing is described above with reference to FIGS. 4A and 4B, and thus the description thereof is simplified.

Figure 7A:
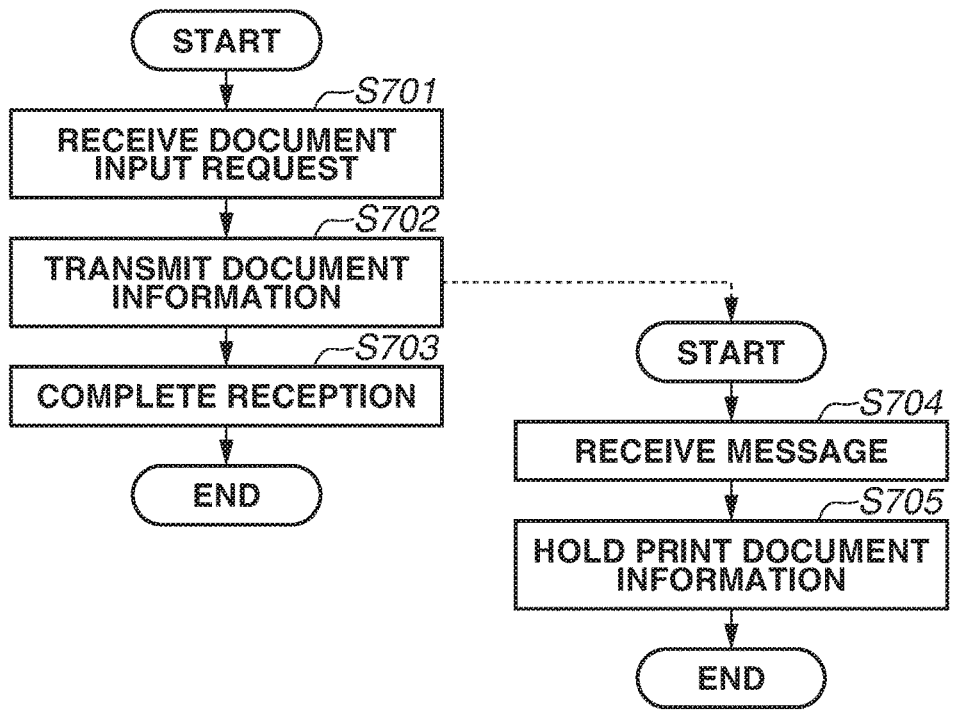
FIG. 7A is a flowchart illustrating processing to be performed in a case where the document server according to a first exemplary embodiment receives an input request from an external apparatus.

FIG. 7A is a flowchart illustrating processing to be performed in a case where the document server 102 receives an input request from an external apparatus. In step S701, when the document server 102 receives a document input request from the external apparatus, the document server 102 causes the document management unit 405 to create the document information 600 and stores the document information 600 into the database 301. In step S702, the message transmission unit 406 transmits the document information 600 to the topic 501 described above. In step S704, the message reception unit 417 of the print server 101 receives the document information 600 from the document server 102. In step S705, the print job management unit 416 creates the print document information 620 based on the document information 600 and stores the print document information 620 into the database 301. The print document information 620 is not the document information 600 itself, and is the only information necessary for the print server 101 to perform print processing acquired from the document information 600.

In step S703, the document server 102 waits until a document upload notification is received from the external apparatus, and completes document input processing when the document upload notification is received. Although not all the processes are illustrated in the flowchart, in the first exemplary embodiment, the message transmission unit 406 transmits the document information 600 to the topic every time the status 605 of the document information 600 is changed.

Figure 7B:
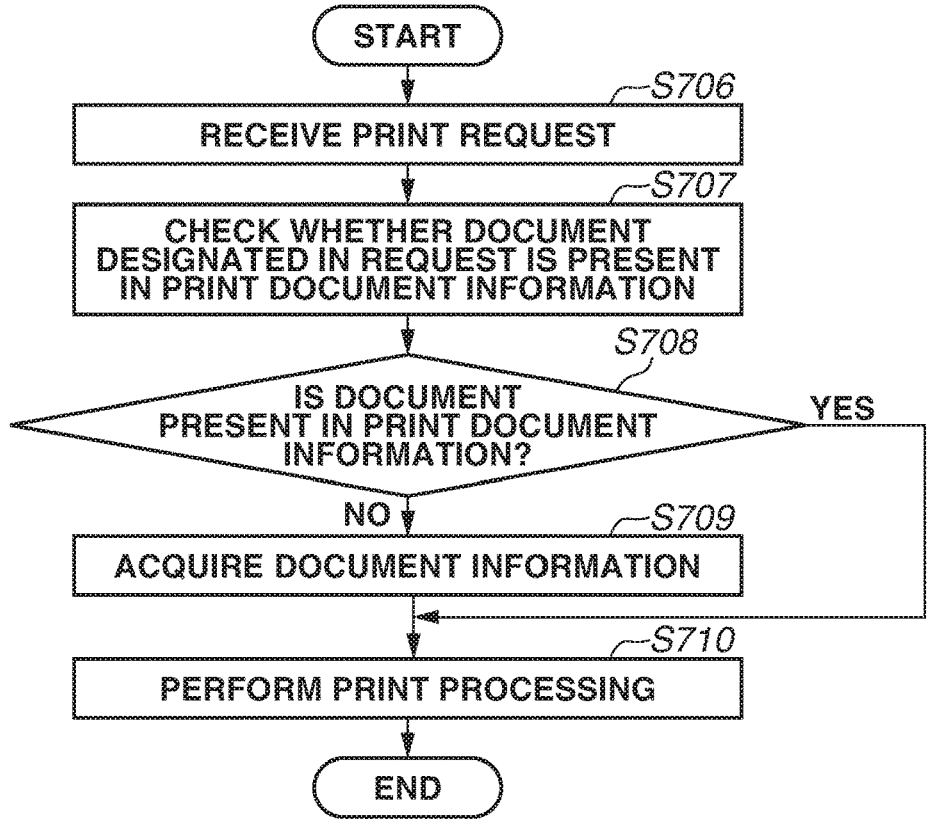
FIG. 7B is a flowchart illustrating processing to be performed in a case where the print server according to the first exemplary embodiment receives a print request from the external apparatus.

FIG. 7B is a flowchart illustrating processing to be performed in a case where the print server 101 receives a print request from an external apparatus. In step S706, when the print control server 412 receives a print request, the print job management unit 416 creates the job information 610 in response to the print request, and stores the job information 610 into the database 301.

In step S707, the print job management unit 416 checks whether the document ID 612 included in the print request is present in the print document information 620. In step S708, if the document ID 612 is present in the print document information 620 (YES in step S708), the processing proceeds to step S710. In step S710, the print job management unit 416 performs print processing. If the document ID 612 is not present in the print document information 620 (NO in step S708), the processing proceeds to step S709. In step S709, the print job management unit 416 acquires document information. The configuration in which the document ID 612 of the print document information 620 is referenced has been described above. However, if the received document information 600 is stored, the document information 600 may be referenced. In any case, the determination to be made in this case is a determination as to whether the document information 600 including the document ID 612 designated in the print request has been acquired.

In step S709, the print job management unit 416 invokes the API of the document server 102, acquires the document information 600 corresponding to the document ID 612, and holds the document information 600 as the print document information 620. In step S710, the print job management unit 416 uses the print document information 620 to instruct the conversion server 413 to convert the document data into print data.

By the processing described above, even when an asynchronous message notification indicating an input of a document from another service is delayed, the reception side determines that the input is delayed, and only in this case, document information can be acquired. Thus, even when a delay occurs in asynchronous communication, invoking of the API of another service can be prevented, so that print processing can be continuously performed.

<Recovery Processing When Message is Delayed (If No Document ID is Designated)>

In the first exemplary embodiment, processing to be performed by the print server 101 when an input notification message from the document server 102 is delayed has been described. In the method according to the first exemplary embodiment, when the document ID 612 is designated in the print request, a delay in the notification can be detected and a recovery can be performed. However, when the document ID 612 is not designated, the recovery cannot be performed.

A use case is assumed in which, when the printer 105 performs pull printing using an IC card, all unprinted documents are printed at once without designation of a document by a user. In this case, although it is necessary to perform processing on the print request using only the information from the user, it is difficult for only the print server 101 to determine whether all input notifications have been received. For example, if three documents are input to the document server 102 and message notifications corresponding to only two documents are sent to the print server 101, the print server 101 prints only the two documents. As a result, the user cannot obtain a desired print result.

A second exemplary embodiment illustrates a method in which the print server 101 detects a delay of a message in a print request in which the document ID 612 is not designated. Reference numerals and names in the drawings are similar to those of the first exemplary embodiment, unless otherwise noted.

<Transmission of Unprinted Document List>

Figure 8A:
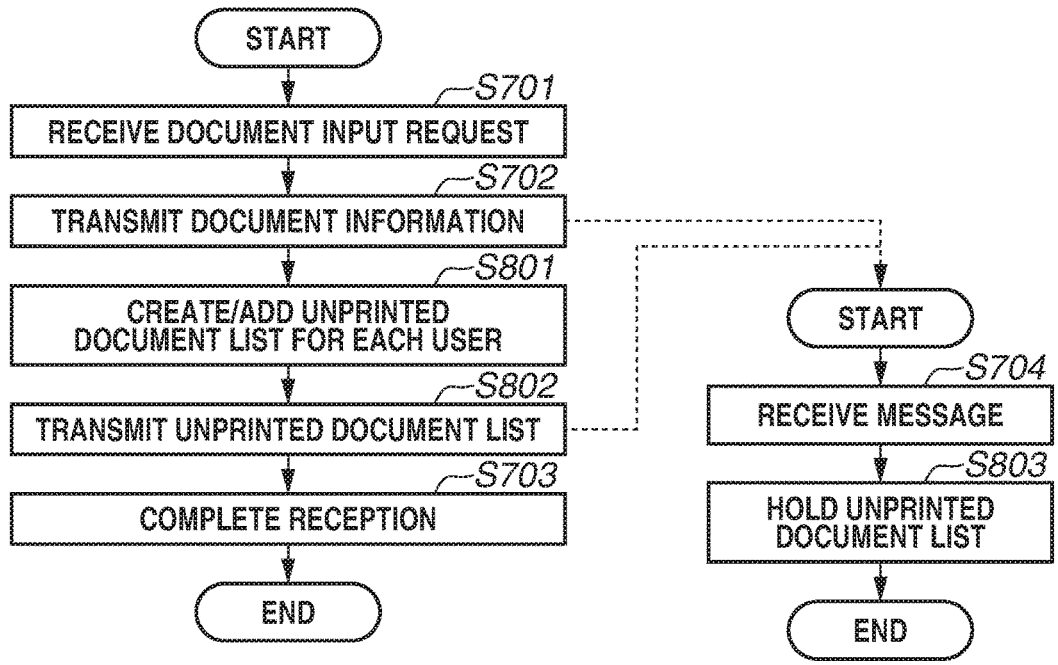
FIG. 8A is a flowchart illustrating processing to be performed in a case where a document server according to a second exemplary embodiment receives an input request from an external apparatus.

FIG. 8A is a flowchart illustrating processing to be performed in a case where the document server 102 receives an input request from an external apparatus. Steps S701 to S704 are similar to those in the first exemplary embodiment, and thus descriptions thereof are omitted. In step S801, the document management unit 405 creates an unprinted document list based on the user name 603 of the document information 600. If the unprinted document list already exists, the target document ID 612 is added to the list. Although not illustrated, the unprinted document list is a list that consists only of information about the document ID 612. In step S802, the message transmission unit 406 transmits the unprinted document list to the topic described above. In step S803, the message reception unit 417 of the print server 101 stores the received unprinted document list into the database 301.

Figure 8B:
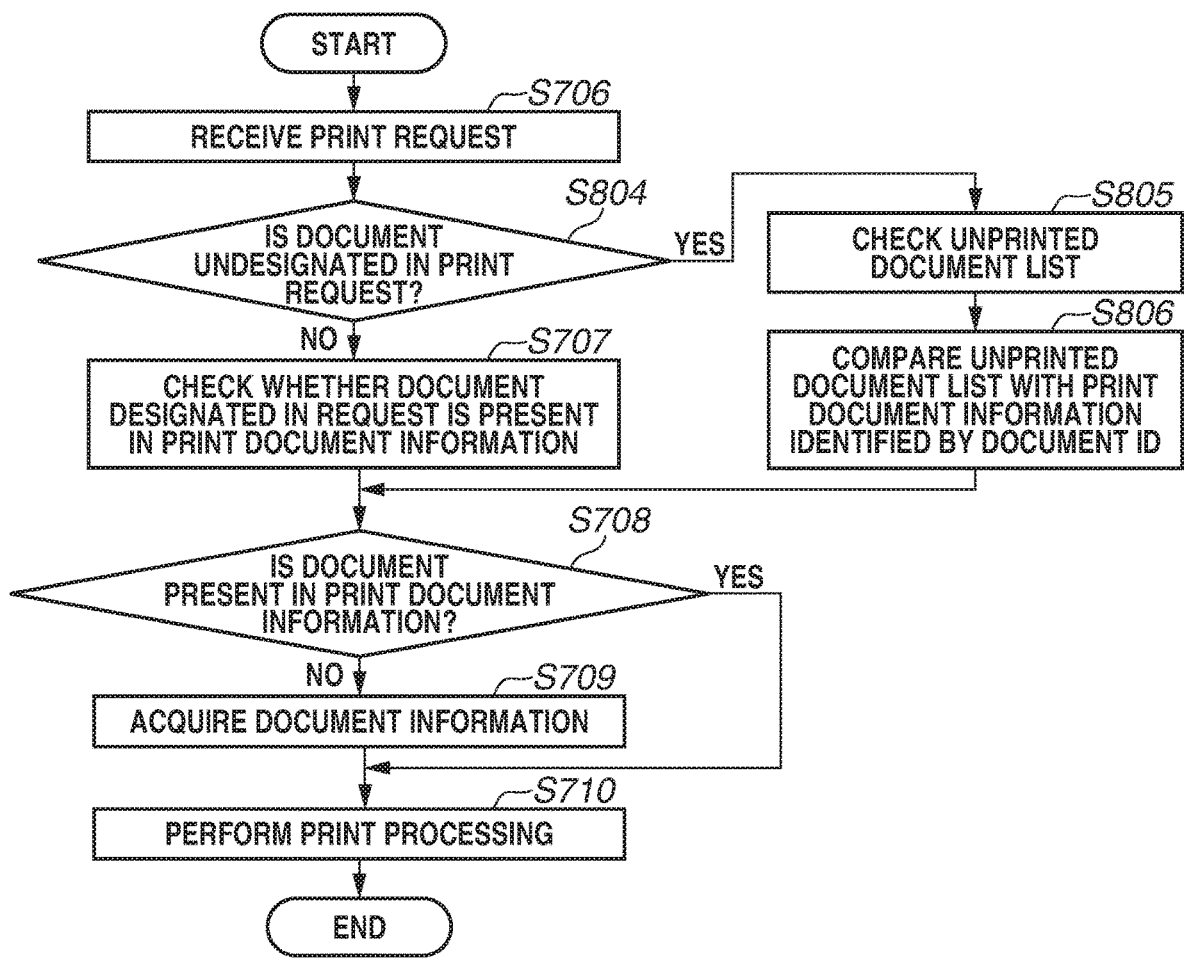
FIG. 8B is a flowchart illustrating processing to be performed in a case where no document ID is designated when a print server according to the second exemplary embodiment receives a print request.

FIG. 8B is a flowchart illustrating processing to be performed in a case where the document ID 612 is not designated in a print request when the print server 101 receives the print request. The processing of steps S706 to S710 is similar to that of the first exemplary embodiment, and thus the descriptions thereof are omitted.

In step S804, the print job management unit 416 checks whether the document ID 612 is undesignated in the print request. In step S804, if the document ID 612 is not undesignated in the print request (NO in step S804), the processing proceeds to step S707. If the document ID 612 is undesignated (YES in step S804), the processing proceeds to step S805.

In step S805, the print job management unit 416 identifies the unprinted document list based on the user name 613 of the user Who has requested printing. In step S806, the print job management unit 416 checks whether the print document information 620 identified by the document ID 612 is present for all document IDs 612 described in the unprinted document list. As a result of comparison, if the document ID 612 is described in the unprinted document list but the print document information 620 is not present, it is determined that the document information is not present (NO in step S708), and the processing proceeds to step S709 to acquire document information. The following steps are similar to those of the first exemplary embodiment.

By the processing described above, even when a document to be printed cannot be identified, it is possible to detect whether a delay has occurred in an asynchronous message, and thus it is possible to output a print product desired by the user.

The second exemplary embodiment described above illustrates the method in which even when a print request in which the document ID 612 is not designated is received, the print server 101 detects a delay of a message. However, since the unprinted document list according to the second exemplary embodiment is also an asynchronous message, it is assumed that the message is delayed depending on the status of a network or the like. A method for detecting a delay of a notification even when the unprinted document list is delayed will be described below. Reference numerals and names in the drawings are similar to those of the first and second exemplary embodiments, unless otherwise noted.

<Recovery Processing When a Message is Delayed (Unprinted Document List is Delayed)>

Figure 9:
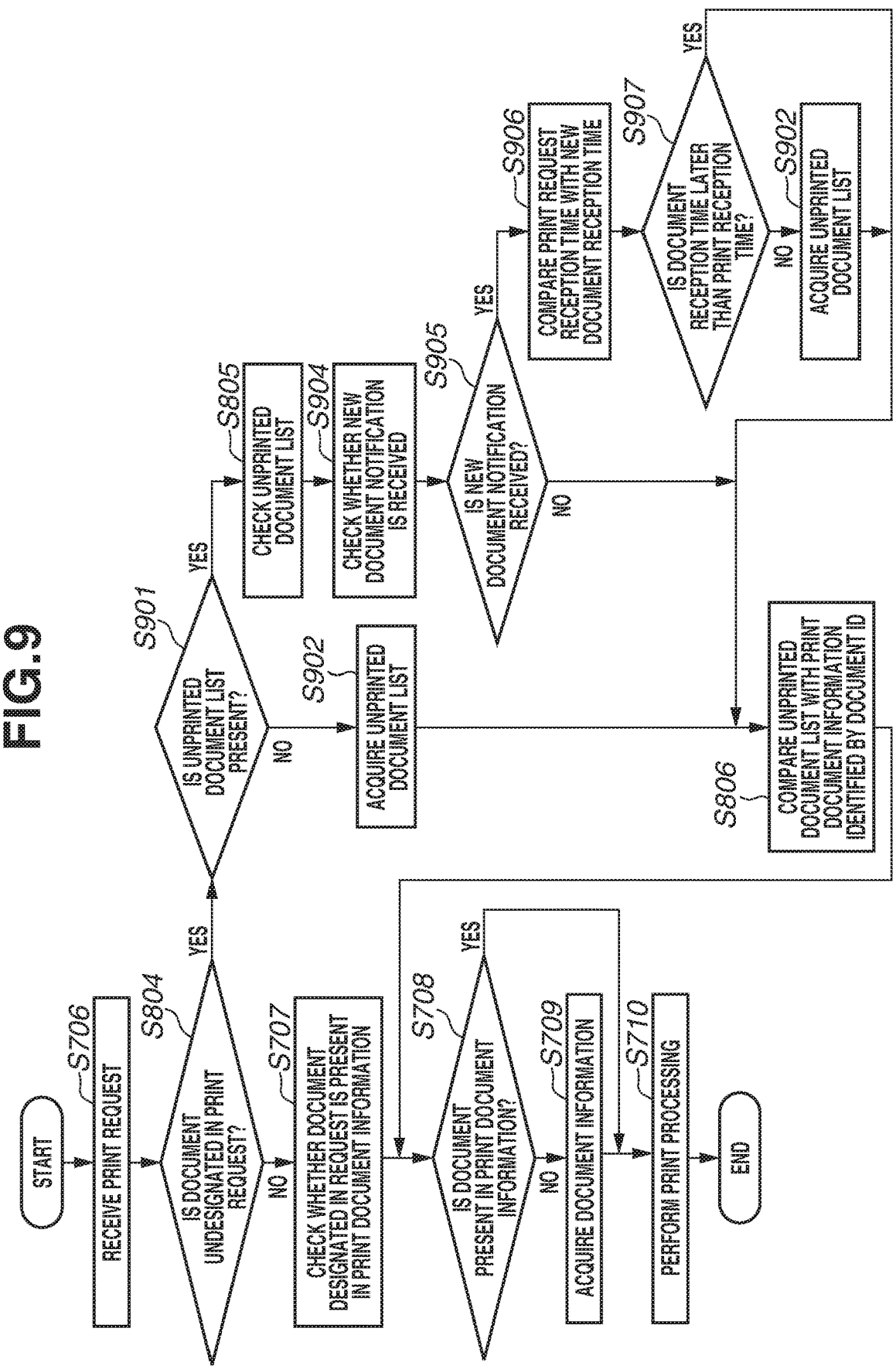
FIG. 9 is a flowchart illustrating processing to be performed in a case where the possibility that an unprinted document list may be delayed when the print server receives a print request from an external apparatus is considered.

FIG. 9 is a flowchart illustrating processing to be performed in a case where the possibility that an unprinted document list may be delayed when the print server 101 receives a print request from an external apparatus is considered. The processing of steps S706 to S710 and S804 to S806 are similar to those of the first and second exemplary embodiments, and thus the descriptions thereof are omitted.

In step S901, the print job management unit 416 checks whether the unprinted document list of the user who has requested printing is present. If the unprinted document list is not present (NO in step S901), the processing proceeds to step S902. In step S902, the print job management unit 416 invokes the API of the document server 102, and acquires the unprinted document list.

If the unprinted document list is present (YES in step S901), the processing proceeds to step S805. Like in step S805 according to the second exemplary embodiment, the print job management unit 416 identifies the unprinted document list based on the user name 613 of the user who has requested printing. In step S904, the print job management unit 416 checks whether a new message is received by the message reception unit 417. In step S905, when a new document is notified, i.e., when new document information is present (YES in step S905), the processing proceeds to step S906.

In step S906, the print job management unit 416 compares the print reception date/time 614 with the reception date/time 623 of the print document information 620. The reception date/time 623 is also a reception date/time of document information when received in the new document notification. However, the reception date/time when the document information is received may be used, and the reception date/time 623 of the print document information 620 is also the reception date/time when the document information is substantially received. In step S907, if the reception date/time 623 is later than the print reception date/time 614, the print job management unit 416 determines that the document is received after the print request is received.

If the reception date/time 623 is earlier than the print reception date/time 614, the print job management unit 416 determines that the document is input before the print request is received. Accordingly, since there is a possibility that the notification of the unprinted document list is delayed, the latest unprinted document list is acquired from the document server 102.

By the processing described above, even when an asynchronous message of an unprinted document list of each user is delayed, it is possible to detect the delay and it is also possible for the user to output a print result at a timing set in a print request made by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)Tm), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133162, filed Jul. 13, 2018, which is hereby incorporated by reference herein in its entirety.

What is claimed is:

1. A print server that acquires document data based on document information, creates print data based on the document data, and transmits the print data to a printer, the print server comprising:
   one or more processors; and
   one or more memories including instructions, that, when executed by the one or more processors; cause the print server implement:
   a first acquisition unit configured to, based on receiving an input request, indirectly acquire document information generated by a document server, wherein the indirect acquisition is performed via a mediation service without calling an API of the document server;
   a determination unit configured to receive a print request from a client, identify a document identification from the print request, and determine whether the document information including the document identification is acquired by the first acquisition unit; and
   a second acquisition unit configured to directly acquire the document information by calling the API in response to a determination by the determination unit that the document information is not acquired, wherein the direct acquisition of the document information by the second acquisition unit is not performed in a case where the determination unit determines that the document information has already been acquired by the first acquisition unit.

2. The print server according to claim 1, wherein the print server registers a software container as a subscription to the mediation service, and acquires the document information from the software container invoked from the mediation service.

3. The print server according to claim 2, wherein the software container is a process to be activated on an operating system of a virtual machine on a physical machine.

4. The print server according to claim 1, wherein the determination by the determination unit is a determination whether the document identification is included in print document information created based on the acquired document information.

5. The print server according to claim 1,
wherein an unprinted document list, in addition to the document information, is asynchronously received via the mediation service, and
wherein the second acquisition unit sends an inquiry to the document server in response to a determination by the determination unit that the document information corresponding to the document identification described in the unprinted document list is not acquired, and acquires the document information that is not asynchronously acquired.

6. The print server according to claim 5, wherein the unprinted document list is acquired in a case where a print request including no document identification is received from the client.

7. The print server according to claim 5, wherein the second acquisition unit sends an inquiry to the document server in response to a determination by the determination unit that the unprinted document list is not acquired, and acquires the unprinted document list that is not asynchronously acquired.

8. The print server according to claim 7, further comprising a comparison unit configured to compare a reception date/time of the print request with a reception date/time of newly acquired document information,
wherein the second acquisition unit sends an inquiry to the document server and acquires the latest unprinted document list in a case where the reception date/time of the newly acquired document information is earlier than the reception date/time of the print request.

9. A control method for a print server that acquires document data based on the document information, creates print data based on the document data, and transmits the print data to a printer, the control method comprising:

indirectly acquiring document information generated by a document server based on receiving an input request, wherein the indirect acquisition is performed via a mediation service without calling an API of the document server;

receiving a print request from a client, identifying a document identification from the print request, and determining whether the document information including the document identification is acquired; and directly acquiring the document information by calling the API in response to a determination that the document information is not acquired wherein the direct acquisition of the document information is not performed in a case where determining that the document information has already been acquired.

10. A non-transitory computer-readable storage medium storing a program for a print server that acquires document data based on document information, creates print data based on the document data, and transmits the print data to a printer, the program causing the print server to execute processing comprising:

indirectly acquiring document information generated by a document server based on receiving an input request, wherein the indirect acquisition is performed via a mediation service without calling an API of the document server;

receiving a print request from a client, identifying a document identification from the print request, and determining whether the document information including the document identification is acquired; and directly acquiring the document information by calling the API in response to a determination that the document information is not acquired wherein the direct acquisition of the document information is not performed in a case where determining that the document information has already been acquired.

* * * * *